Jan. 26, 1954  R. G. MASON  2,667,323
EXTENSIBLE ARTICLE SUPPORT
Filed Dec. 11, 1951  2 Sheets-Sheet 1
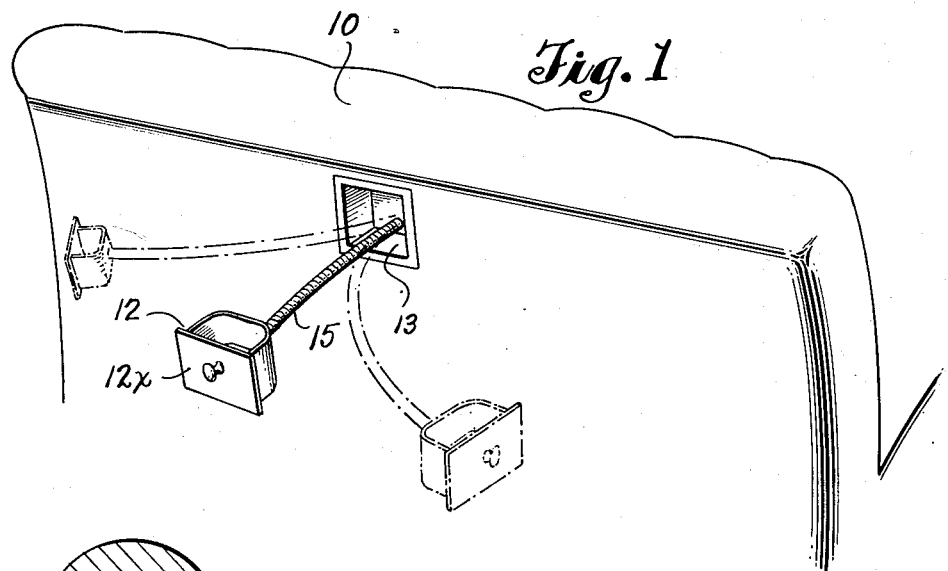
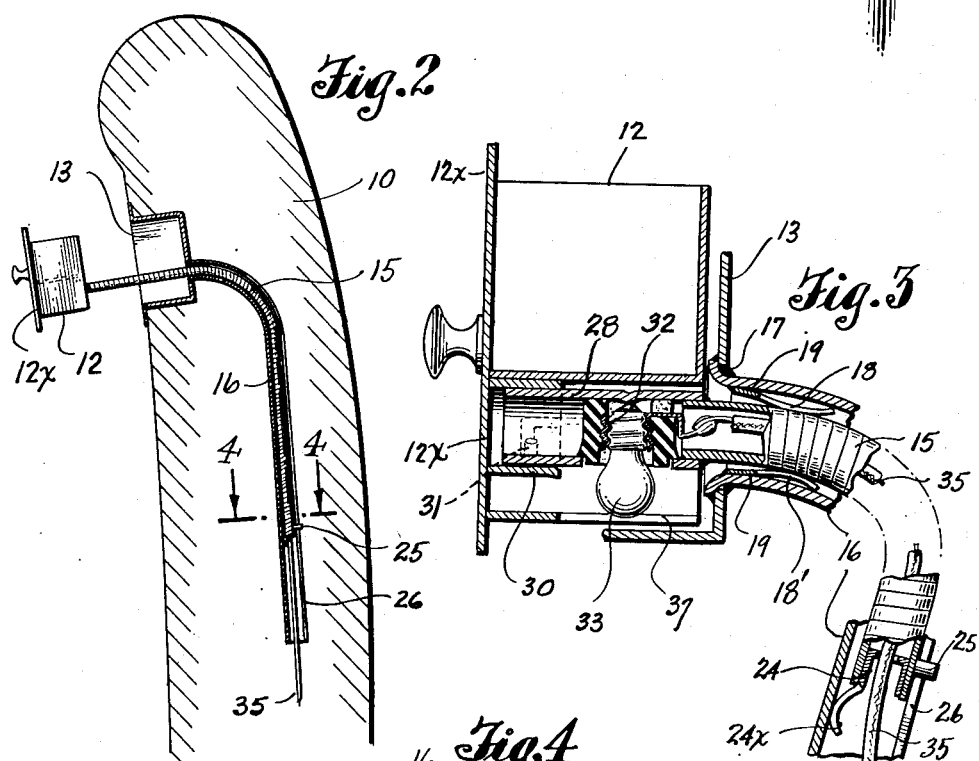
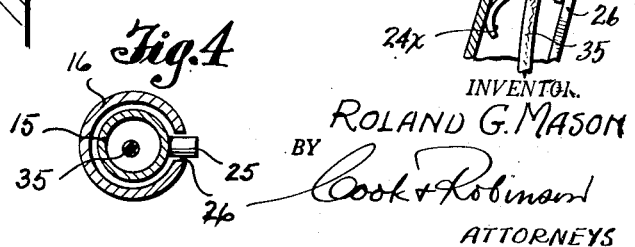
INVENTOR.
ROLAND G. MASON
BY
Cook & Robinson
ATTORNEYS Jan. 26, 1954   R. G. MASON   2,667,323
EXTENSIBLE ARTICLE SUPPORT
Filed Dec. 11, 1951   2 Sheets-Sheet 2
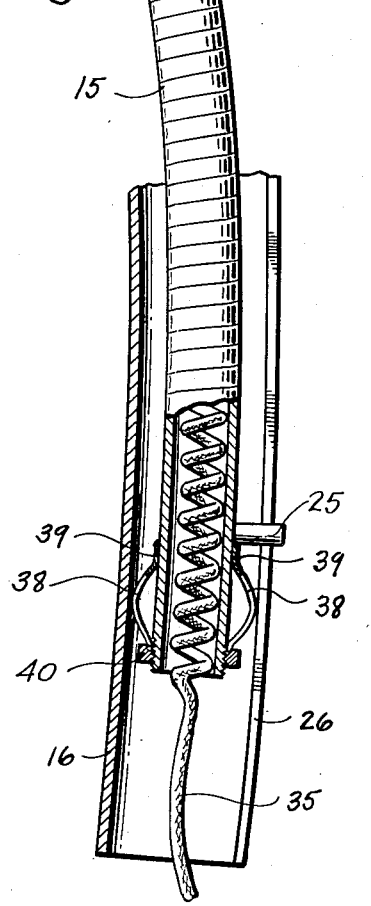
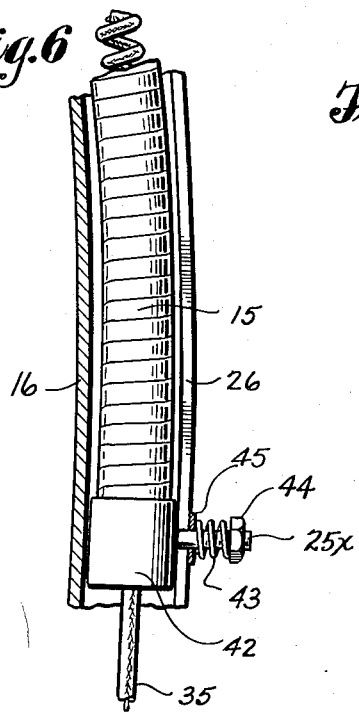
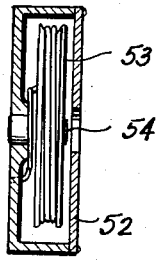
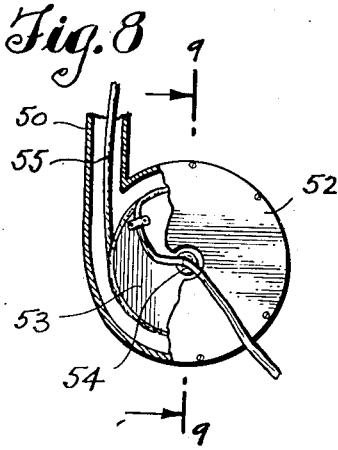
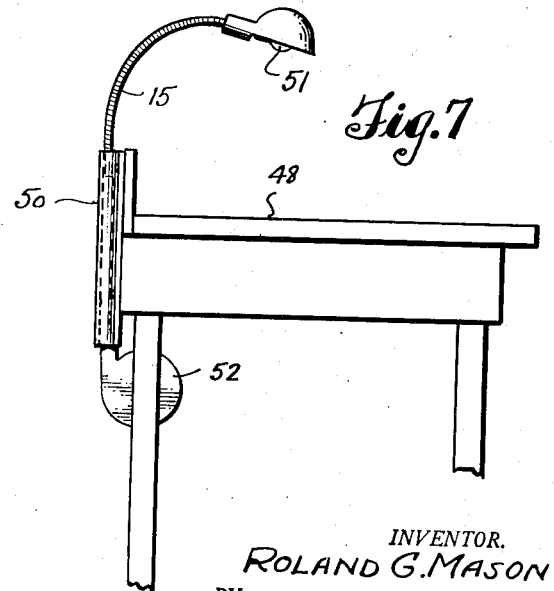
INVENTOR.
ROLAND G. MASON
BY
Cook & Robinson
ATTORNEYS

Patented Jan. 26, 1954

2,667,323

UNITED STATES PATENT OFFICE 2,667,323

EXTENSIBLE ARTICLE SUPPORT

Roland G. Mason, Seattle, Wash.

Application December 11, 1951, Serial No. 261,009

4 Claims. (Cl. 248—298)

This invention relates to extendable and retractable supporting means for various kinds and types of articles. More particularly, the invention has reference to a flexible support whereby an article such as an ash tray, serving tray, mirror, lamp or sunshade, may be adjusted to and held at various positions of use, and which provides for the movement of the support and supported article to a housed position, or place out of the way when not in use.

It is the principal object of the present invention to provide novel means of the above stated character that is characterized by the use of a universally bendable cable as the supporting means and a containing and supporting housing onto and from which the cable can be adjusted. Furthermore to provide the cable, at its outer end, with means for the attachment thereto and the functional support of various articles of the character of those above mentioned, and whereby the articles can be held in various positions of use or adjustment by reason of the flexibility or bendability of the cable.

It is a further object of my invention to provide an article supporting means of the above stated character wherein the flexible or bendable cable has sufficient rigidity to sustain the supported article at a set position under normal usage yet is easily manually bendable to effect any desired positioning of the supported article within the limits of adjustment and extension of the cable.

Other objects of the invention reside in the provision of a means on the cable that is adapted to coact with guiding means on the cable housing for holding the cable against rotation, and to provide novel friction means for retaining the cable at any set position of extension or retraction.

Still further objects of the invention reside in the details of construction of the various parts of the device in its various forms or modifications, and in the combination of parts and the mode of use of the device as will hereinafter be fully described.

In accomplishhing the above mentioned and other objects of the invention, I have provided the improved details of construction, the preferred forms of which are illustrated in the accompanying drawings, wherein—

Fig. 1 is a perspective view illustrating what might be the back portion of a seat of an automobile, or a railway coach seat, or the like, that is equipped with article supporting means embodied by the present invention.

Fig. 2 is a vertical, sectional view of the back of the seat showing the cable holding and guiding tube or housing, with the cable partly withdrawn therefrom and supporting an ash tray.

Fig. 3 is an enlarged, cross-sectional view of the ash tray and the means attaching it to and supporting it from the extendable cable.

Fig. 4 is an enlarged, cross-sectional view taken on the line 4—4 in Fig. 2.

Fig. 5 is an enlarged, longitudinal section of the inner end portion of the cable and its housing, showing the friction means and guide stud at the inner end of the cable.

Fig. 6 is a sectional view, similar to that of Fig. 5, illustrating an alternative type of friction and guide means at the inner end of the cable.

Fig. 7 is a side view of a lamp support and guide as applied to a table; this being a modification of the present invention.

Fig. 8 is a side view of the reel housing as used in the device of Fig. 7; parts being broken away for better showing of the reel.

Fig. 9 is a cross-section of the reel housing, taken on line 9—9 in Fig. 8.

Since it is not the desire that use of the present invention be restricted to specific places or articles, I have illustrated what I now consider to be some of its most probable adaptations. Primarily the invention is based upon use of a supporting cable of a form of construction that permits it to be bent or curved in various directions so that an article as supported thereby may be located in the most desirable position of use. Such a cable is sometimes referred to as "gooseneck" and it is generally formed by the spiral winding of a metal strip to form a semi-rigid tube wherein the convolutions of the strip are close fitted and may be somewhat interlocked in a manner to retain their close relationship but without preventing the bending or flexing of the cable. In the following description the term "cable" will be used to designate this particular type of tubular member, which is characterized by the fact that it is universally bendable without kinking, flattening, or in any way changing its cross-sectional shape or length, and has sufficient rigidity to serve its intended functions as an article support, but can be easily manually bent to a desired form.

Referring more in detail to the drawing—

In Figs. 1 and 2, I have illustrated one of the typical and common uses to which the present invention can be put. In these views, 10 designates what may be the back portion of an automobile seat and 12 designates an ash tray of box-like form adapted to be received within and pulled from a housing 13 that is fixed in the seat structure in any suitable manner, and opening to the rear of the seat. Fixed to the ash tray, in a manner presently more fully described, is a predetermined length of the flexible, tubular supporting cable 15 that characterizes the invention and which is adapted to be housed within a guide tube 16, which is well shown in Fig. 2, is fixedly secured in the seat structure in any suitable position, and at one end opens through the back wall 13' of the housing 13, and is fixed thereto as indicated at 17 in Fig. 3, substantially perpendicularly from the back wall.

It is shown in Fig. 2 that the tube 16 is curved downwardly from the housing 13 to extend within the central portion of the seat back structure. However, if desired, the guide tube 16 could be otherwise directed. For example it might be spirally formed, as is the tube 16s in Fig. 10, or could be made straight, as is tube 16x in Fig. 11, or it might be given other forms, depending upon the structure or object with which the invention is to be associated.

The guide tube 16, in any of its forms, is of sufficiently greater diameter than the cable 15 that the latter can be easily moved endwise therein. But it is desirable that friction means be fixed to the cable, at its inner end and that other friction means be applied to the tube at its outer end, for the purpose of yieldingly holding the cable against free or easy movement from any position to which it has been manually adjusted.

As seen in Fig. 3, the friction means applied within the outer end of the guide tube comprises two leaf springs 18 and 18', disposed at diametrically opposite sides of the cable, and extending lengthwise thereof with outer ends secured to the wall of tube 16, as at 19, and inwardly bowed between their ends to frictionally engage the cable. These springs retain the cable centered in that portion of the tube 16 and also supplement the friction means at the inner end of the cable in holding the cable at a set position of endwise adjustment in the tube.

The friction means applied to the inner end of the cable 15, as shown in Fig. 3, comprises a clip 24 that is fitted in the inner end of the cable and which is formed with an extended spring finger 24x that bears frictionally against a side of tube 16.

In order that the cable 15 may not rotate in the guide tube 16, a stud 25 is mounted rigidly thereon at its inner end to extend radially therefrom. This stud is contained in and is adapted to move within a slot 26, formed lengthwise of the tube 16, and extending therealong to an extent that will permit adjusting of the cable 15 to the extent desired.

As a means for the convenient mounting of the ash tray 12 on the outer end of the cable 15, I have rigidly secured a tubular extension member 28 to the outer end of the cable, as shown in Fig. 3. The outer end of this extension member 28 is adapted to be fitted in a tubular socket 30 that is fixed to the inner face of the front wall member 12x of the ash tray, and is therein secured by a bayonet type pin and slot connection indicated in dotted lines at 31 in Fig. 3.

Mounted in the tube 28 is an insulated socket 32 for mounting a small electric lamp 33. Electric current is brought to the socket through an insulated circuit wire 35, leading from a source of electric energy, not shown; the wire 35 being brought to the lamp through the tubular cable 15. Control of the circuit is by use of a suitable switch not herein shown.

When the ash tray 12 is drawn out to an extended position, as in Fig. 1 or 2, light from the lamp 33 will be directed downwardly through an opening 37 in the lower side of the ash tray housing. If it is desired, for better use of the lamp, the ash tray 12 may be disconnected and removed from the cable by unseating the piece 28 from the socket 30 of the tray.

In Fig. 5, I have illustrated an alternative means for applying a cable holding friction means and for adjusting the holding tension of the friction means. In this structure, leaf springs 38—38 are applied to the opposite sides of the cable, lengthwise thereof, and with upper ends fixed to the cable as at 39. The lower ends of the springs seat against a nut 40 that is threaded onto the end portion of the cable and this nut can be adjusted to cause the springs to be bowed outwardly and pressed more or less tightly against the walls of the guide tube 16.

In Fig. 5 I have also shown the manner of coiling the circuit wire 35 in the tubular cable 15 in order to give sufficient length of wire for the full extension of the cable 15 from the housing 16. When the cable is pushed back from an extended position to its inner position, the circuit wire 35 automatically assumes its pre-formed, spirally coiled formation.

In Fig. 6 I have illustrated yet another friction means for the cable 15; this being at the inner end of the cable and associated with the guide stud 25x. In this view, 42 designates a collar that is contained in tube 16 and fitted and secured to the cable 15, and to which collar the guide stud 25x is fixed. The stud extends through and beyond the slot 26 of tube 16. Applied about the outer end portion of the stud is a coiled spring 43 and this is held under compression by a nut 44 that is threaded onto the stud. At its inner end the spring bears against a friction plate 45 that seats against the wall of tube 16. Any desired holding friction is obtained by an adjustment of the nut 44 to increase or decrease the pressure of spring 43.

I have, in Fig. 7, shown the present invention applied to a table 48. In that embodiment of the invention, the cable 15 is contained for endwise adjustment in a vertical tube 50 that is fixed to the table. The cable extends from the upper end of the tube, and at its outer end supports a common form of reading lamp 51. At its inner end, the tube 50 opens into a reel housing 52 as seen in Fig. 8, in which housing a reel 53 is rotatably mounted on an axis 54. Insulated circuit wires 55 extend to the lamp through the cable 15 and are wound on the reel 53 which can be placed under spring tension for automatic rewinding when the cable 15 is retracted into the tube 50.

Various other adaptations of the invention include its application to a hospital bed for holding a lamp or tray; a support for a microphone for radio broadcasting, or as a holder for a baby nursing bottle. My invention is believed to encompass and be practical in many applications or uses and is not to be understood as limited to the applications or uses specifically described or disclosed herein.

Having thus described my invention, what I claim as new therein and desire to secure by Letters Patent, is:

1. A retractable and extendable lamp support comprising a tubular guide housing adapted for fixed mounting on a supporting structure, a universally bendable cable received within said tubular guide housing and extensible therefrom, means at the outer end of said cable for supporting a selected article, the extended portion of said cable being bendable to either side of the guide housing, means preventing rotation of said cable relative to the guide housing, and means frictionally retaining the cable in selected positions of extended adjustment, said last recited means including at least one spring one end of which abuts the guide housing and the other end of which is movable, and means for adjusting the positioning of the movable end of the spring to adjust its frictional engagement with the surface of the guide housing.

2. A retractable and extendable lamp support according to claim 1 wherein said means preventing rotation of the cable relative to the guide housing includes a pin extending outwardly from the cable and engaged in a longitudinally elongated slot formation, and said friction means further includes a friction plate abutting said guide housing at the slot formation and slidable with said pin, and said spring of the friction means is coiled about the pin with said one end abutting said friction plate, and said means for adjusting the positioning of the movable end of the spring includes a nut threadably engaged on the outer end of said pin.

3. A retractable and extendable lamp support comprising a tubular guide housing adapted for fixed mounting on a supporting structure, a universally bendable cable received within said tubular guide housing and extensible from the outer open end thereof, means at the outer end of said cable for supporting a selected article, the extended portion of said cable being bendable to either side of the guide housing, means preventing rotation of said cable relative to the guide housing, friction means on the inner end of said cable frictionally retaining the cable in selected positions of extended adjustment, and means inwardly of the open end of said housing maintaining the cable concentrically thereof.

4. A retractable and extendable lamp support according to claim 3 wherein said last recited means includes a pair of spring elements interposed between the cable and the portion of the housing adjacent the open end thereof, and said friction means including a single spring carried by the inner end of said cable and resiliently engaging the inside surface of said housing.

ROLAND G. MASON.

References Cited in the file of this patent

UNITED STATES PATENTS

| Number | Name | Date |
|---|---|---|
| 1,772,980 | Bennett | Aug. 12, 1930 |
| 2,115,898 | Zagora | May 3, 1938 |
| 2,150,222 | Hoffman | Mar. 14, 1939 |
| 2,481,271 | Willey | Sept. 6, 1949 |

FOREIGN PATENTS

| Number | Country | Date |
|---|---|---|
| 344,938 | Italy | Dec. 2, 1936 |
| 577,721 | Germany | June 3, 1933 |